Patented Aug. 5, 1952

2,606,019

UNITED STATES PATENT OFFICE 2,606,019

FRAME SUSPENSION ARRANGEMENT FOR VEHICLES

Ernest Edward Smith and Franklin Alfred Manning, Mentone, Victoria, Australia

Application May 5, 1950, Serial No. 160,114
In Australia May 6, 1949

4 Claims. (Cl. 267—15)

This invention relates to improvements in frame suspension arrangements for vehicles, and is more particularly applicable for use with road vehicles such as automobiles and the like.

The invention may be considered as a modification or improvement of the general type of vehicle suspension means as described and illustrated in the specification of prior Australian Patent No. 101,493, but it has decided advantages over and above the means referred to, and indeed other or more convention types of frame suspension means for vehicles.

It is the primary object of the present invention to devise a frame suspension arrangement for vehicles, whereby the vehicle will be supported in a positive yet resilient manner with a maximum amount of stability, smoothness, and safety, particularly when travelling at high speeds. It is an important characteristic of the present invention that the frame and body of a vehicle supported thereby will remain in a substantially level condition irrespective of different relative elevations of individual wheels within very wide limits.

We propose that each pair of wheels, i. e., at the front or rear of the vehicle, be so arranged that both wheels are adapted to be supported by respective arms or axles extending transversely of the vehicle and adapted to be resiliently influenced by a common air cushion or inflatable element.

The air cushion or inflatable element is adapted to extend transversely of the vehicle at the relative end and the transverse arms are arranged to pivot and to influence the air cushion at the side remote from the particular wheel carried by the arm.

The air cushion is of elongated, sausage like configuration, and is preferably formed of flexible but non-stretchable material such as rubberised fabric and is capable of being inflated with a compressible fluid, such as air, at a desired pressure. For that purpose a valve and/or cock is provided at a suitable position in the wall of the air cushion. The walls of the air cushion may be formed by a molding process in order to avoid joints and consequent weakness in the walls.

The invention will be better understood from the following description, and accompanying sheet of drawings, which describes a practical embodiment which is at present preferred.

Figure 1:
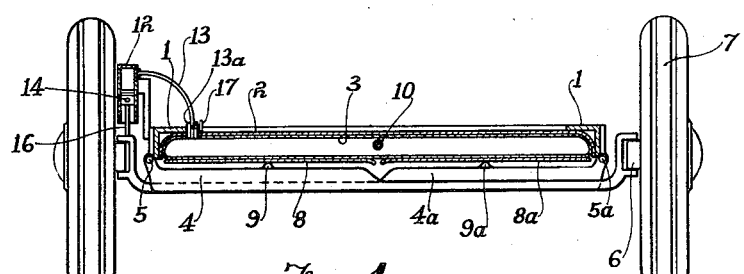
Figure 1 is a front, and partly sectional, view of the front and steering wheels and suspension arrangement of a vehicle.

Accordingly, the relative end of the frame or chassis 1, of the vehicle is provided with a plate or trough-like transverse member 2 beneath which an air cushion or inflatable element 3 provided with a valve or cock 10 is adapted to repose. At each respective side of the chassis relative to the transverse member is pivoted or hinged, as at 5 and 5a, an arm or axle and 4a which extends transversely and beneath the transverse member and air cushion terminating at the remote end, at the opposite side of the chassis, in a stub axle 6 on which a wheel 7 may be mounted.

Beneath the air cushion, longitudinally thereof and transversely with respect to the vehicle are mounted two bottom plates 8 and 8 a of substantially equal length each adapted to bear upon half of the under side of the air cushion 3. Connecting bosses 9 and 9a are provided between each bottom plate and the arm or axle pivoted adjacent to the relative end of the air cushion.

It will thus be seen that any upward movement of one wheel and radial movement of the relative arm or axle about its pivot will cause the respective bottom plate to press against the air cushion at the side which is remote from the wheel and closest to the pivot of the particular arm.

Figure 2:
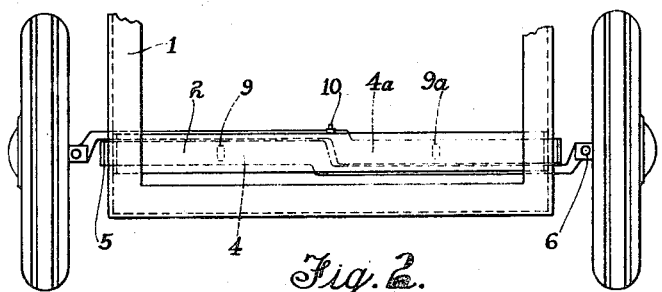
Figure 2 is a plan view of Figure 1.

The arms 4 and 4a which extend in side-by-side relationship from their respective pivots to the wheels at the opposite sides of the frame may be of such configuration that the portions thereof carrying the bosses 9 and 9a, and the stub axles 6 at their ends, are in a substantially straight line (see Fig. 2). If desired suitable vertical guide ways (not shown) may be provided to permit a radial movement of the arms in a substantially vertical plane whilst restraining them from any backward or forward movement.

A stabilizer device one only of which is shown, may be provided at the outer end of each of the wheel-carrying arms, and such stabilizer may comprise a cylinder 12 mounted on the frame of the vehicle in communication with the air cushion, or inflatable element 3, through, for example, a flexible conduit 13 joined with a metal coupling 13a attached to or formed integrally into the respective end of the cushion, and a piston 14 within the cylinder being mechanically connected, by rod 16, to the outer end of the respective wheel carrying arm.

With such a stabilizer device, the piston connected to the arm will normally be under the influence of pressure equal to that in the air cushion, and vertical movement or reciprocation of the relative end of the arm will be damped by the fluid pressure in the cushion. A tap or cock, indicated at 17, will preferably be provided on the coupling in order that communication between the cylinder and the cushion may be closed or opened if desired for any reason.

The couplings 13a attached at the ends of the cushion may be secured to the transverse member of the chassis to firmly retain the air cushion in position.

It will be appreciated that the cylinder 12 and piston 14 should be of such size and have such capacity for fluid displacement, as to efficiently perform their purpose in co-operation with a particular air cushion.

Figure 3:
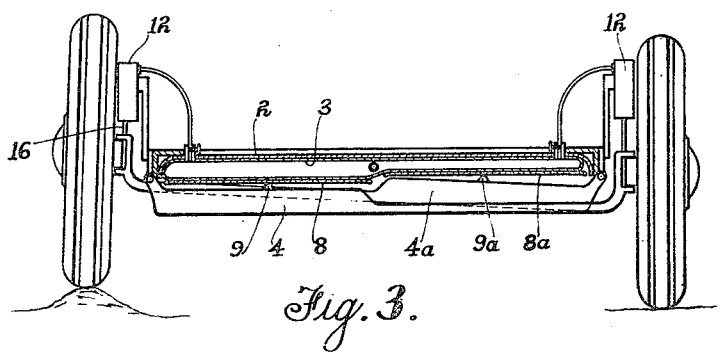
Figure 3 illustrates a phase of the arrangement in operation.

In operation, and referring to Fig. 3, shocks or vertical movements experienced by any particular road wheel will be imparted to the underside of the remote half of the air cushion; similarly pressure will be imparted through the relative stabilizer piston and cylinder into the adjacent side of the cushion, and the pressure of the fluid in the cushion is equally distributed over the whole interior thereof thus effectively balancing such shock or movement of the wheel.

As, for example, upward movement of a particular wheel is transmitted to the opposite side of the chassis or frame through the air cushion or inflatable element, the movement is effectively cushioned and stabilized; and the net result is that the frame or chassis of the vehicle tends to remain in a substantially level or horizontal condition.

The ends of the arms referred to as carrying stub axles may be provided with king pins and other mechanical arrangements for steering as may be desired.

Whilst the foregoing description is more particularly related to the front or steering end of the vehicle it is to be appreciated that adaptions may be readily made to the arm and axle wheel supporting structure to accommodate driving means for rear wheels when the improved arrangement is provided at the rear or driving end of the vehicle.

Suspension arrangements in accordance with the foregoing have been found to give highly satisfactory results, a minimum of road shock being imparted to the body of the vehicle through the suspension arrangements, with a high safety factor and a minimum of body roll and like disadvantages characteristic of and attributable to more conventional suspension arrangements.

It is to be understood that various alterations modifications and/or additions may be made in the foregoing without departing from the spirit and scope of the invention.

Having now described our invention, what we claim as new and desire to secure by Letters Patent is:

1. An improved frame suspension arrangement for a wheeled vehicle, comprising a frame, a pair of transverse arms pivoted respectively at opposite sides of the frame and extending to the other side of the frame and terminating in means for attachment to road wheels, an inflatable element extending transversely upon the frame for engagement on the underside by the arms, said inflatable element being of elongated and relatively flat formation and accommodated within an inverted trough-like transverse member on the frame of the vehicle, and a pair of bottom plates each bearing upon approximately one-half of the underside of the inflatable element and connected with the transverse arms by means of bosses.

2. An improved frame suspension arrangement for a wheeled vehicle, comprising a frame, a pair of transverse arms pivoted respectively at opposite sides of the frame and extending to the other side of the frame and terminating in means for attachment to road wheels, an inflatable element extending transversely upon the frame for engagement on the underside by the arms, and a stabilizer device connected between the outer end of each arm and an adjacent portion of the vehicle frame, said stabilizer device comprising a cylinder in communication with the inflatable element, and a piston reciprocable within the cylinder, each cylinder and piston being respectively mechanically connected between the frame and the outer end of the relative wheel carrying arm, whereby relative movement between the outer ends of the arms and the frame of the vehicle will be damped by fluid pressure in the inflatable element.

3. An improved vehicle suspension according to claim 1, wherein a stabilizer device is connected between the outer end of a wheel carrying arm and an adjacent portion of the vehicle frame.

4. An improved vehicle suspension according to claim 1 wherein a wall of the inflatable element is provided with a valve whereby the inflatable element may be inflated or deflated as may be desired in accordance with variable operative conditions.

ERNEST EDWARD SMITH.
FRANKLIN ALFRED MANNING.

REFERENCES CITED

The following references are of record in the file of this patent:

UNITED STATES PATENTS

| Number | Name | Date |
|---|---|---|
| 1,893,800 | Home | Jan. 10, 1933 |
| 2,451,277 | Crowley | Oct. 12, 1948 |

FOREIGN PATENTS

| Number | Country | Date |
|---|---|---|
| 101,493 | Australia | June 30, 1937 |
| 489,803 | Great Britain | Aug. 4, 1938 |